2,830,937
Patented Apr. 15, 1958

2,830,937

11-HYDROXYLATION OF 17-α-HYDROXY STEROIDS BY THE GENUS STACHYLIDIUM

Jacob W. Davisson, Levittown, N. Y., assignor to Chas. Pfizer & Co., New York, N. Y., a corporation of Delaware No Drawing. Application December 26, 1956
Serial No. 630,440

10 Claims. (Cl. 195—51)

This invention is concerned with a method for the oxygenation of certain steroid compounds by means of selected cultures of microorganisms. In particular, it is concerned with the introduction of an hydroxyl group at the 11-position of the steroid nucleus in either the α- or the β-configuration. A particularly useful reaction which may be accomplished with the present process is the conversion of compound S (Reichstein's Substance S or 11-desoxy-17-α-hydroxy-corticosterone) and compound S esters to compound F (Kendall's compound or 17-α-hydroxy-corticosterone) and to compound epi-F (17-α-hydroxy-epicorticosterone).

Preparation of biologically active steroid compounds, such as cortisone, 11-β, 17-α-dihydroxyprogesterone, compound F, and compound epi-F, is fraught with many great difficulties. One of the most difficult problems is the introduction of oxygen atoms at certain specific positions in the steroid nucleus, particularly at the 11-position of this nucleus. Compound S is available by known synthetic routes from various naturally occurring, relatively cheap, steroid starting materials such as the vegetable-type steroid compounds. On the other hand, compound F is considerably more difficult to obtain and is a very valuable compound, particularly useful in the treatment of rheumatoid arthritis and certain other conditions of the human body. Therefore, the process whereby compound S may be converted to compound F in good yield and without undue expense is of tremendous value to the pharmaceutical industry and to the public in general. In addition, compound epi-F is useful as an intermediate in organic synthesis, especially in the preparation of cortisone, which has shown utility in the treatment of rheumatoid arthritis, asthma and certain types of dematitis.

It has now been unexpectedly discovered that the reaction may be successfully carried out by the use of organisms selected from the genus Stachylidium, which genus belongs to the order Moniliales. Even more surprising, is the fact that 11-α-hydroxylation is concurrently obtained, thus affording a convenient route to compound epi-F. Hence, microorganisms of this genus have shown very good results with regard to the introduction of both an 11-α and an 11-β hydroxyl group in compound S and in other steroid molecules possessing a methylene group in the 11-position and and an α-hydroxy group at the 17-position of the nucleus, such as compound S esters and 17-α-hydroxyprogesterone. These reactions have been carried out in good yield, the products being isolated with ease and readily purified. Furthermore, the organism is extremely simple to grow and can easily be employed in large scale commercial operations; the ease with which the organism readily grows on very cheap media is also of particular advantage here. Hence, the practical preparation of such substances as compound F and compound epi-F on a large scale by biochemical means is possible by the use of this invention.

It has been found that by contacting a steroid compound, in particular those having a methylene group in the 11-position and an α-hydroxy group at the 17-position, with the oxygenating activity of a microorganism of the genus Stachylidium, i. e., with the organisms themselves or enzyme systems of the organisms, the hydroxylation of these steroid compounds is accomplished. Among the reactions which may be carried out is the conversion of compound S to compound F and to compound epi-F. The organisms with which we are concerned are oxygenating strains of the genus Stachylidium; of particular value are strains of the species *Stachylidium theobromae*. One organism employed was obtained from The Imperial Institute of Mycology at Kew, England (isolate under our Code No. 1464–233M) while another was obtained from The Centraal Bureau voor Schimmel Culture at Baarn, The Netherlands (isolate under our Code No. 1464–287B).

Other microorganisms from the genus Stachylidium may be selected for conducting the process of this invention. Many of these organisms are available in public culture collections and others may be isolated from natural materials, such as the soil, by standard procedures well known to mycologists. In particular, an organism of the species *Stachylidium bicolor* can be used to oxygenate at the 11-β-position of these cortical steroid type compounds. As indicated above, the process of the present invention may be used for the conversion of compound S to compound F and to compound epi-F. However, the process may also be used for the 11-oxygenation of other steroid compounds which are unsubstituted at the 11-position of the nucleus and which possess a 17-α-hydroxy group such as compound S esters and 17-α-hydroxyprogesterone. In addition, various side chains may be present at the 17-position of the nucleus, e. g., that in compound S, or the esters and ethers thereof. In the 3-position, a keto group or a hydroxyl group or the ethers and esters thereof may be present. The steroid compounds used as substrates for the reaction may also possess carbon to carbon double bonds at various points of the nucleus, such as the 3,4- or 5,6-positions.

It should be realized that the yield of oxygenated product will vary to some extent with the nature of the steroid compound employed as starting material, with the particular strain of Stachylidium used, and with the conditions employed for the reaction (i. e., temperature, time, pH, nutrient medium, time at which the compound is added to the microorganism, etc.). Furthermore, a given oxygenating microorganism of the preferred species may show variation in its effect upon the various steroid compounds, i. e., the yields will vary somewhat. The presence of an hydroxyl group at the 21-position of the cortical steroid type compounds serves to enhance hydroxylation at the 11-position. Incidentally, best yields have been obtained with steroids possessing twenty-one carbon atoms. Various known methods may be used for the isolation and identification of the products afforded by these processes.

The cultivation of the microorganism preferably takes place in aqueous nutrient media at a temperature of about 24–30° C., under submerged conditions of agitation and aeration. Nutrient media which are useful for these purposes include carbohydrates such as sugars and starch, corn meal, a source of organic nitrogen such as casein, soybean meal, peanut meal, wheat gluten, cottonseed meal, lactalbumin, enzymatic digest of casein, and tryptone. A source of a growth substance such as distillers' solubles, yeast extract, molasses fermentation residues, as well as mineral salts such as sodium chloride, sodium nitrate, potassium phosphate, magnesium sulfate, and trace minerals such as copper, zinc and iron may also be utilized with desirable results. Incidentally, if excessive foaming is encountered during the fermentation, antifoaming agents, such as vegetable oils, may be added to the fermentation medium. It is interesting to note the pH of the fermentation tends to remain rather constant, being in the range of from pH 6–7; however, if variations are encountered, a buffering agent such as calcium carbonate may also be added to the medium.

Inoculum for the 11-hydroxylation of cortical type steroids by the growth of Stachylidium may be obtained by employing culture slants propagated on media such as potato-dextrose-agar or beef lactose. The growth may be used to inoculate either shaken flasks or inoculum tanks for submerged growth, or alternatively, the inoculum tanks may be seeded from the shaken flasks. The growth of the microorganism usually reaches its maximum in about two or three days. However, variations in the equipment used, the rate of reaction, rate of stirring and so forth may affect the speed with which the maximum activity is reached. In general, the fermentation is continued until substantial growth is obtained, a period of about 24 hours to four days being sufficient for most purposes. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must be maintained throughout the transfer of the inoculum and throughout the growth of the microorganism.

The steroid compound as a solid, or in a solution with a suitable solvent such as acetone or ethanol, is added to the cultivated microorganism under sterile conditions, and the mixture is agitated and aerated in order to bring about the growth of the microorganism and oxygenation of the steroid substrate. The steroid may be added when the medium is seeded under sterile conditions with a culture of the microorganism or after growth of the organism is established. In some cases, it may be found advisable to add the steroid compound after growth of the microorganism has been established in the nutrient medium under aerobic conditions. This is particularly true if there is a tendency to produce undesired by-products from the steroid substrate during the initial stages of growth of the microorganism. The acetate or other ester of a steroid may be used in place of the alcohol itself, although this may sometimes lead to a somewhat lowered yield of hydroxylated product. Another method which is most useful is one in which the microorganism is grown on a suitable nutrient medium under aerobic conditions in the absence of a steroid. The mycelial growth may then be filtered from the broth and washed with distilled water. The mycelium is then suspended in an aqueous solution of the steroid substrate. Agitation and aeration of the mixture is continued for a period of from about 12 to 48 hours after which time the product is of the reaction are isolated. This process has the advantage of ease of recovery of the steroid compound, since the various nutrient materials originally used to aid the growth of the microorganism are now absent as are the various materials excreted by the growing organisms during the initial period. Other methods familiar to enzyme chemists may be utilized for conducting the present oxygenating process. The rate of oxygenation, and hence, the proportion of products formed as well as the nature of the by-products may vary depending on whether the whole fermentation broth or only the isolated washed mycelium is used.

Alternatively, enzyme preparations from the growth of a suitable oxygenating organism of the genus Stachylidium may be used for conducting the process. These may be prepared by a variety of methods from the cells of the chosen organisms. Several different methods may be used to release these oxidizing enzymes from the cells. These include grinding, particularly with abrasive materials such as powdered glass or sand, which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° to about 50° C. The cells disintegrate within one to several days and the cell residue may be removed by filtration, for instance through a Seitz filter or through a sintered glass bacterial filter. A third method for preparing cell-free elaboration products of the Stachylidium useful for the reactions of this invention is by repeated, rapid freezing and thawing of the cellular material. Another method is by the use of ultrasonic energy to rupture the cells. One further method of use for the same purpose is by the use of a water-miscible solvent and, in particular, acetone. The cells, when placed in such a solvent, are ruptured and an extract of the desired enzymes is obtained. The Stachylidium enzymes may be used for the oxidation of 17-α-hydroxy steroid compounds in media similar to those used with the grown cells, that is, one containing a hydrogen acceptor such as fumarate, a buffer and, in some cases, a bivalent metal, particularly magnesium, as well as a minor proportion of adenosine triphosphate. The cell-free oxidizing enzymes of Stachylidium may be used in media indicated above at a temperature of about 20° to about 40° C. In general, the oxidation of the desired steroid compounds is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks "Manometric Technique in Tissue Metabolism," by W. W. Umbreit et al., Burgess Publishing Company, Minneapolis (1949), and "Respiratory Enzymes," by H. Lardy, Burgess Publishing Company, Minneapolis (1949).

In general, a concentration of one to two percent by weight of the total weight of substrate (for instance, the compound S-type material) is preferred in conducting this process, although sometimes other concentrations may be found to be more favorable. In view of the limited solubility of the starting material in water, an excess of the material may be slowly converted to the oxygenated product. However, the state of subdivision of the steroid when added to the oxygenating system, i. e., a growing microorganism or enzyme system, does not appear to greatly affect the yield or the nature of the products formed under otherwise identical conditions. If a water-miscible solvent solution of the steroid compound is added to the aqueous fermentation system, the steroid is generally precipitated in a finely divided form in the presence of a large excess of water; it was found that this did not appreciably improve the rate of reaction as compared to the method involving the addition of dry, relatively large crystals of the steroid.

After completion of the oxygenation process, the product may be recovered from the mixture by extraction with a suitable water-immiscible solvent; chlorinated lower hydrocarbons, ketones and alcohols, such as chloroform, methylene chloride, trichloroethane, ethylene dichloride, and so forth are useful. The use of chloroform is particularly advantageous for the extraction of the desired products. The extract containing the product and unreacted starting material may be concentrated in vacuo to a small volume or else to dryness to obtain a solid product. Purification of the product may be accomplished in several ways; one of the most effective methods is the use of chromatography by means of which the products are separated from the starting material and from other products such as epimers and more highly oxygenated materials that may be formed during the reaction; adsorbents such as a silica gel are particularly useful for this purpose. It has been found that a column prepared by treating silica gel and a lower alcohol, especially ethanol, is particularly useful for the separation of the steroid starting materials. The steroid mixtures in the form of concentrated chloroform or methylene chloride solutions may be applied to columns of adsorbents such as silica gel. The column may then be washed with additional amounts of the solvent to remove such impurities as fats and pigments. The column is then developed by means of a mixture of the chlorinated lower hydrocarbon solvent with a small percentage, for example, 1 to 5% by volume of a lower alcohol (methanol, ethanol, etc.). The materials are separated into layers and the separated compounds fractionally eluted from the column by utilization of a mixture of solvents of gradually increasing polarity; for instance, a mixture of methylene chloride and a minor, but then gradually increasing amount of ethanol is very useful.

Fractions of eluted material from the chromatographic column may then be checked for the nature of the product by subjecting small portions of the solutions to paper chromatography. Methods which are particularly useful for conducting this type of separation and analysis are described in detail in U. S. Patent 2,602,769, issued on July 8, 1952, to H. C. Murray et al.; and in a publication by Shull et al. in the Archives of Biochemistry, vol. 37, p. 186 (1952). Incidentally, this method is also very useful for evaluating new strains of microorganisms to determine their usefulness in the process of this invention. The fermentation may be conducted on a small scale with a steroid such as compound S as the substrate, and the entire extract of the fermentation mixture may then be concentrated and subjected to paper chromatography. By utilizing known samples of compound S, compound F and other related products as suitable standards for comparison, it is possible to determine when the chosen microorganism is commercially practicable for the present process.

Descending paper chromatograms utilizing paper treated with a 35% solution of propylene glycol and developed with a mixture of 78 volumes of toluene and 22 volumes of dioxane may be employed for the rapid evaluation of various strains of the preferred microorganisms. A separation of this type can be completed in as little as three hours and the dried paper chromatogram may be examined under ultraviolet light with a fluorescent scanner such as that of Haines and Drake (Federation Proceedings, 1950, vol. 9, p. 180) to determine the position of the various materials, such as compounds S and F, by their fluorescence. The zones in which the various substances occur may be marked and then cut out from the sheet or strip of paper. The material may then be eluted with a solvent such as ethanol and the practically pure solid material obtained by evaporation. A quantitative analysis of such a mixture may be accomplished in this manner; the amount of the isolated products may be determined by measuring the ultraviolet absorption of solutions of these materials. In addition, the absorption characteristics of these compounds when dissolved in concentrated sulfuric acid are particularly characteristic.

Upon separation of the reaction products by column chromatography, the desired eluate fractions may be combined and concentrated to a small volume. The product may then be crystallized and this material further purified by recrystallization from a suitable solvent such as ethyl acetate. Some of the products afforded by application of the present process have been compared with samples of authentic compound F and found to be identical with it in all respects. 11-$\beta$, 17-$\alpha$-dihydroxyprogesterone prepared by the process of this invention has also been compared with a standard sample and shown to be identical with it in all respects.

The following examples are given by way of illustration and are not to be considered as imposing any limitation on this invention.

Example I

A culture of an organism received from the culture collection of the Imperial Institute of Mycology in Kew, England, and designated by them as *Stachylidium theobromae* (isolate under our Code No. 1464–233M) was propagated on a potato-dextrose-agar nutrient medium at 28° C.; a living culture of this organism has been deposited with the American Type Culture Collection in Washington, D. C., where it has been given the accession number ATCC 12474. A slant culture of this strain was inoculated into each of several 300 ml. Erlenmeyer flasks containing 100 ml. of a sterile medium having the following composition:

| | Percent |
|---|---|
| Glucose | 1.0 |
| Lactose | 2.0 |
| Corn steep liquor, by weight | 6.0 |
| Calcium carbonate | 0.55 |
| Sodium sulfate | 0.1 |
| Corn meal | 1.2 |
| Soybean oil | 0.25 |

Distilled water, adjusted to pH 6.5 with potassium hydroxide.

After shaking the above mixture for 5 days at 28° C., 10 mg. of Reichstein's Substance S was added dry to each of the flasks; throughout these operations the fermentation mixture was maintained under sterile conditions. The mixture was then shaken for a period of about 48 hours at a temperature of about 28° C. The contents of the flask were then exhaustively extracted with several portions of chloroform using one-half of the aqueous phase each time. The combined chloroform extracts were dried over anhydrous sodium sulfate and, after the drying agent was filtered off, the solvent was evaporated under vacuum until a solution volume of about 1–2 ml. was obtained. A sample of this solution was then subjected to paper chromatography using a system of solvents containing propylene glycol and toluene. It was demonstrated that the product contained compound F by examining the paper chromatogram under ultraviolet light with a sample of authentic compound F as a control; indications of the presence of compound epi-F as well as more highly oxygenated products were also obtained.

The chloroform concentrate was then placed on a chromatographic column consisting of silica gel mixed with a small volume of ethanol (1 ml. of ethanol per gram of silica gel). The column was developed by means of a mixture of 98 volumes of ethylene chloride and 2 volumes of ethanol. The effluent from the column was collected in small fractions of equal volume and the latter were periodically examined by means of paper chromatography in order to identify the separate fractions containing the desired product. All of the desired fractions (chromatographically identical) were combined and the resulting solution was evaporated in vacuo to obtain the solid product; this proved to be compound F by comparing a known sample of the same material.

Example II

A culture of *S. theobromae* (isolate under our Code No. 1464–233M) was grown in several flasks containing 100 ml. of a medium consisting of soybean meal (3.3%) and potassium dihydrogen phosphate (1.14%). After shaking at 28° C. for 48 hours this inoculum was added under sterile conditions and with agitation to a pot containing 2 liters of a medium having the same compositions as in Example I. The inoculated medium was aerated at the rate of about one-half to one volume of air per volume of solution per minute for 23 hours; during this time, the mixture was stirred at the rate of about 1700 revolutions per minute while the vessel containing this mixture was placed in a constant temperature bath at 28° C. The 500 ml. aliquot of this broth was diluted with distilled water to 2 liters, and 500 mg. of compound S was added dry to the fermentation mixture under sterile conditions. The reaction was then continued for a further 16 hours under exactly the same conditions as described above.

The entire reaction mixture was removed from the fermentation vessel and the mixture extracted twice with an equal volume of chloroform; the extracts were then combined and evaporated to dryness. The dry solids so obtained were dissolved in a small volume of ethylene chloride and this solution was added to a column of silica gel. The silica gel column had been prepared previously by treating each gram of silica gel with 1 ml. of ethanol; this mixture was then suspended in ethylene chloride and poured into a chromatographic column, followed by washing with ethylene chloride. After the steroid mixture had been introduced into the column, it was washed again with several portions of ethylene chloride to remove fats and pigments. The column was then developed by adding a mixture of 98 volumes of ethylene chloride and 2 volumes of ethanol. The eluate was divided into a series of small fractions. Portions of these were analyzed by means of the paper chromatographic system described above and those fractions containing the same compound were combined. It was found that the first material leaving the column was recovered compound S; this may be reused. The second material leaving the column was an unidentified steroid. The third material leaving the column was recovered and shown to be chromatographically identical with compound F. By removing the solvent from the combined fractions containing compound F, there was obtained a dry product, which after three recrystallizations from ethyl acetate melted at 201° C.; $[\alpha]_D^{25°}$ +163° (C, 1; $CHCl_3$); $E_{max}$=15,911; its infrared absorption pattern and sulfuric acid chromogen were identical with a pure sample of compound F. Quantitative chromatography revealed that 52% of compound S had been converted to compound F; in addition, 24% of a more polar compound was obtained. Further chromatography of this second compound, on several systems and against various controls, showed this to be compound epi-F.

Example III

A culture of an organism available from the Nagao Institute of Tokyo, Japan (isolate under our Code No. 1464–272A), was grown in flasks under aerobic conditions on the medium described in Example I. This organism has been established as belonging to the *Stachylidium bicolor* species. A living culture of this organism has been deposited with the American Type Culture Collection in Washington, D. C., where it has been added to its permanent collection of micro-organisms under the accession number ATCC 12672. After 24 hours of growth, 100 ml. of this mixture was used to seed 2 liters of the medium described in Example II. After the 2 liter mixture had been grown under aerobic conditions for 24 hours, 0.5 gram of compound S was added to the fermentation mixture under sterile conditions. The reaction mixture was then removed from the vessel in which the fermentation had been conducted and extracted three times with one-half volume of chloroform each time. The extracts were combined and concentrated in vacuo to a smaller volume. The mixture was then placed in a column of silica gel which has been previously described. The silica gel column was washed with methylene chloride and then developed with a solution of ethanol in methylene chloride. The 11-β-oxygenated product, compound F, as well as a smaller amount of compound S starting material, was recovered from the column. The isolated product was purified, and its melting point and other physical properties were compared to that of an authentically pure synthetic sample; these were shown to be identical. Furthermore, the compound F obtained in this manner was tested for its effect by means of the mouse glycogen storage test in animals which had been adrenalectomized; it proved to be highly active, thus further establishing the nature of the product.

Example IV

A culture of *Stachylidium theobromae* was grown from preformed inoculum, as in Example II and the latter added to a vessel containing a medium having the following composition:

| | Percent |
|---|---|
| Soybean flour | 2.0 |
| Corn meal | 1.0 |
| Ferrous sulfate heptahydrate | 0.00025 |
| Magnesium sulfate heptahydrate | 0.00125 |
| Distilled water, adjusted to pH 6.8 with potassium hydroxide. | |

After growth had been achieved in the same manner as in Example II, a 500 ml. aliquot of this broth was diluted with distilled water to 2 liters, and 500 mg. of compound S was added dry to the fermentation mixture under sterile conditions and with agitation; the reaction was continued for an additional 16 hours. The mixture was then extracted with one-half volume of chloroform three times, and the combined chloroform extracts were concentrated in vacuo to a small volume. The mixture of steroids was then purified by column chromatography on silica gel in the usual manner; assay of the fractions gave a 68% yield of compound F and 15% of compound epi-F on the basis of the amount of compound S employed.

Example V

A culture of *S. theobromae* was grown from preformed inoculum and a 5% suspension of this material was added to 25 gallons of medium as in Example II. After growth and dilution as in Example IV, 25 g. of compound S were added to 25 gallons of mash. Assay of the reactants in the usual manner gave evidence of a 32% yield of compound F and a 6% yield of compound epi-F.

Example VI

A culture of an organism received from the culture collection of the Centraal Bureau voor Schimmel Culture at Baarn, The Netherlands, and designated by it as *S. theobromae* (isolate under our Code No. 1464–287B) was used as in Example II. It was found that 39% of the S compound added was converted to compound F and 31% was converted to compound epi-F.

Example VII

A culture of *S. theobromae* was grown as described in Example II above, except that 17α-hydroxyprogesterone was used in place of compound S. After the conclusion of the fermentation, the crude product was extracted by means of chloroform and the solvent was then removed under vacuum. The residual product was purified by column chromatography as described above to afford a product that was shown by means of paper chromatography and other physical constants to be 11-β, 17-α-dihydroxyprogesterone.

Example VIII

The procedure of Example II was repeated, except that compound S acetate was used as the starting steroid. The recovered product was identified by its physical constants as being compound F.

In a like manner, compound F was also obtained when compound S propionate, compound S butyrate, compound S benzoate and compound S thenoate were employed as the starting materials in individual reactions.

What is claimed is:

1. A process for 11-hydroxylation of a steroid compound possessing a 17-α-hydroxy group and having a methylene group in the 11-position of the nucleus, which comprises contacting said steroid compound with the oxygenating activity of an organism selected from the genus Stachylidium.

2. A process as claimed in claim 1 wherein the steroid compound is contacted with the oxidizing enzymes of an organism of the genus Stachylidium.

3. A process as claimed in claim 1 wherein the steroid compound is subjected to the action of a growing culture of the microorganism.

4. A process as claimed in claim 1 wherein the microorganism is cultivated in an aqueous nutrient medium under submerged conditions until substantial growth is obtained, and the steroid compond is then contacted with the fermentation mixture.

5. A process for the 11-hydroxylation of a steroid compound possessing a 17-α-hydroxy group and having a methylene group in the 11-position of the nucleus, which comprises contacting said steroid compound with the oxygenating activity of an organism chosen from the group consisting of the species *Stachylidium throbromae* and *Stachylidium bicolor*.

6. A process as claimed in claim 4 wherein the steroid compound is selected from the group consisting of compound S, compound S esters and 17-α-hydroxyprogesterone.

7. A process for the conversion of compound S to a mixture of compound F and compound epi-F, which comprises contacting compound S with the oxygenating activity of an organism chosen from the species *Stachylidium theobromae*.

8. A process for the preparation of compound F and compound epi-F, which comprises cultivating *Stachylidium theobromae* in an aqueous nutrient medium under aerobic conditions until substantial growth is obtained, and then adding compound S to the fermentation mixture.

9. A process for the preparation of 11-β, 17-α-dihydroxyprogesterone, which comprises contacting 17-α-hydroxyprogesterone with the oxygenating activity of an organism chosen from the genus Stachylidium.

10. A process for the introduction of the 11-β-hydroxy group of a cortical steroid type compound possessing a 17-α-hydroxy group, which comprises contacting a 17-α-hydroxy-11-desoxycortical steroid type compound with the oxygenating activity of a strain of the species *Stachylidium bicolor*.

References Cited in the file of this patent

UNITED STATES PATENTS

| | | |
|---|---|---|
| 2,649,401 | Haines | Aug. 18, 1953 |
| 2,649,402 | Murray | Aug. 18, 1953 |
| 2,658,023 | Shull | Nov. 3, 1953 |
| 2,765,258 | Shull | Oct. 2, 1956 |
| 2,793,162 | Thoma et al. | May 21, 1957 |